Dec. 16, 1969    J. MALCZEWSKI    3,483,711
METHOD OF COOLING THE INTERIOR OF A CHAMBER
Filed Jan. 29, 1968    2 Sheets-Sheet 1

INVENTOR:
Jérémie Malczewski
BY Spencer & Kaye
Attorneys 3,483,711
METHOD OF COOLING THE INTERIOR
OF A CHAMBER
Jérémie Malczewski, Boulogne, France, assignor to Societe Anonyme dite: Bronzavin, Courbevoie, France, a French society
Filed Jan. 29, 1968, Ser. No. 701,253
Claims priority, application France, Feb. 8, 1967, 94,112
Int. Cl. F25d 17/06; B64c 1/00
U.S. Cl. 62—91    5 Claims

ABSTRACT OF THE DISCLOSURE

A method of cooling the interior of a chamber having a continuously changing atmosphere of which the walls are at a higher temperature than the atmosphere within the chamber comprising injecting a finely atomised liquid into the chamber at a point where the temperature of the atmosphere is sufficiently high to completely evaporate the injected liquid and removing the vapour so formed before it returns to the liquid phase.

---

Figure 1:
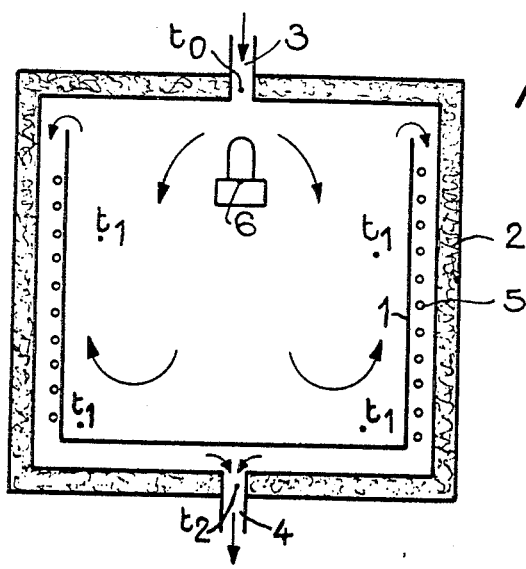

This invention relates to a method of cooling the interior of a chamber of which the walls are at a higher temperature than the atmosphere within the chamber, and more particularly to cooling and conditioning the air within an airliner flying at supersonic speed.

Present air-conditioning devices for supersonic aircraft take off air at high temperature from the jet engine compressors and distribute it in the cabin at a temperature close to 0° C.

This cold air must not only renew the breathable air and maintain the required cabin pressure, but must above all compensate for the heat contribution from the walls of the cabin (which, for example at Mach 2, are at more than 120° C.), so as to maintain the atmosphere within the cabin at about 24° C. It is this last function which determines the quantity of air flowing into the cabin and the temperature of this air.

Since, during supersonic flight there is no cold source (and at the most very limited heat sinks such as the fuel), such a conditioning device relies on a process based on a series of compressions and expansions of air (the principle of the calorie pump). It is thus extremely complex, heavy and cumbersome.

A main object of the present invention therefore is to provide a method whereby the air introduced into a chamber under the conditions referred to above may be cooled, and especially when the chamber is the interior of a supersonic aircraft, which method enables a considerable gain in weight of equipment to be achieved.

In general however the conditioning of a breathable atmosphere is not limited to maintaining an ideal temperature; it is concerned also with producing an acceptable humidity level.

In transport aircraft cruising at an altitude greater than about 36,000 feet, the humidity of the conditioned air is practically nil. It is thus desirable to humidify the air within the cabin to improve the comfort of the passengers and it is also necessary to humidify the air of the flight deck so that the faculties of the crew members are not impaired.

Hitherto, for practical reasons, humidification has been limited to the flight decks of aircraft and for this purpose, a boiler was used heated by an electric resistance consuming several kilowatt-hours. It will be observed however that this process produces a considerable addition of heat in the cabin which obviously has to be removed thus accentuating the cooling problem in a supersonic aircraft. Moreover, the use of steam gives rise to numerous difficulties: The steam ducts have to be insulated, there is a risk of personnel being scalded at the output points of the steam, and visible clouds of condensation vapour are very common. Numerous methods of avoiding these disadvantages have been tried, none of which has proved wholly satisfactory.

One attempt to deal with this problem in a supersonic aircraft consisted in injecting a quantity of water into the air in the conditioning system between the air take-off points in the engine compressors and the inlet point for the air into the aircraft cabin. However, since the air entering the cabin is at 0° C., the water content of the conditioned air tends to freeze towards the cabin inlet so that some of it is deposited as frost in the pipes of the conditioning system and that entering the cabin appears as a frozen cloud or even snow. From the aspects of mechanical efficiency of the conditioning system, and of passenger comfort, this method clearly leaves much to be desired.

A further object of the invention therefore is to provide a method whereby an acceptable humidity level can be maintained within the cabin of a supersonic aircraft without giving rise to the disadvantages enumerated above.

According to the invention, a method of cooling the interior of a chamber, the atmosphere within which is constantly renewed and of which the walls are at a higher temperature than the atmosphere within the chamber, comprises injecting into the chamber a controlled amount of a finely atomised liquid spray at a point where the temperature of the atmosphere is sufficiently high to evaporate the liquid, and evacuating the vapour so formed before it reverts to the liquid phase.

Experience has shown that the vapourisation of finely divided droplets of water diffused in the air of the chamber absorbs a large quantity of heat upon evaporations and it is essential that the vapour be evacuated from the chamber whilst it contains this heat. Thus in the method of the invention, the vapour is essentially evacuated from the chamber before reverting to the liquid phase. The quantity of liquid injected may be controlled automatically in dependence upon the temperature of the chamber interior to maintain the latter at a constant temperature. This is particularly important where the chamber is the interior of a supersonic aircraft since large quantities of heat are continually being produced during supersonic flight due to air-friction on the outer skin of the aircraft. It is important to observe that when the method of the invention is employed, the same means are used both to cool and humidify the atmosphere within the aircraft and a very considerable saving in weight for the conditioning system is obtained.

Figure 2:
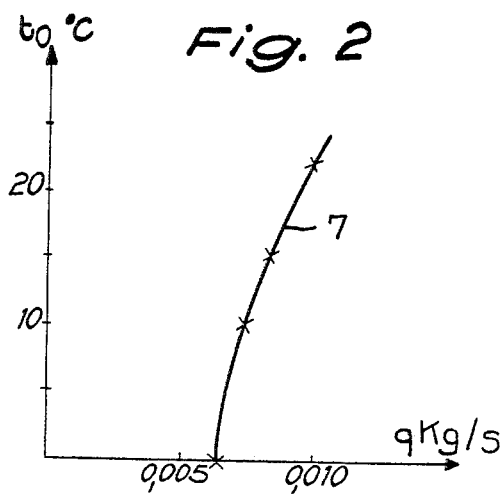
Figure 3:
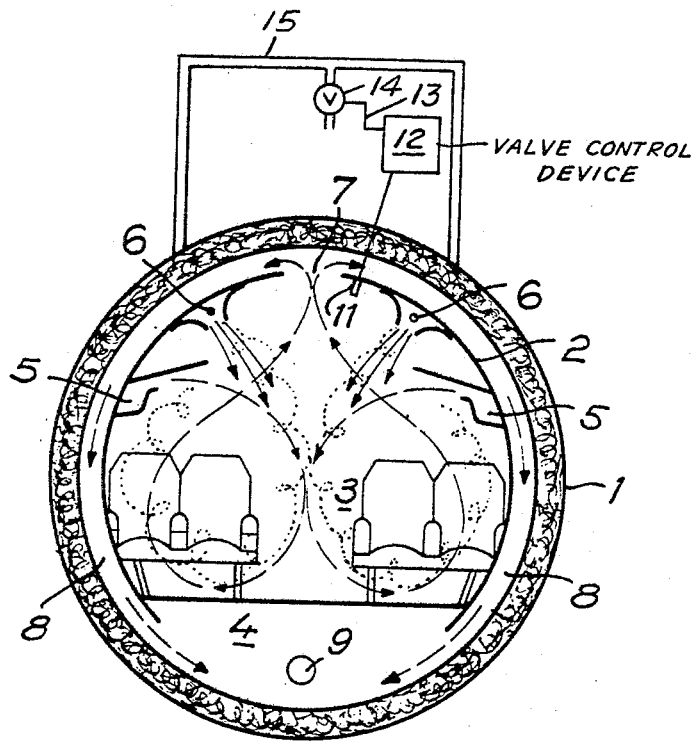

The invention will now be described in greater detail by way of example with reference to the accompanying drawings in which FIG. 1 is a schematic sectional view of a device for simulating the conditions prevailing in the cabin of a supersonic aircraft flying at supersonic speed, in which device the method of the invention was carried out and measurements made, FIG. 2 is a graph illustrating the variation of the quantity of dry air to be introduced as a function of its temperature, in order to maintain in the simulator a substantially constant temperature, whilst an atomised water spray maintains a 40% relative humidity in the chamber, FIG. 3 is a sectional view of the cabin of a supersonic aircraft showing one manner in which a series of atomisers may be arranged to carry out the method of the invention.

To demonstrate the advantageous results obtainable by employing the principle of the present invention, there will now be described some experiments in air conditioning which are carried out using the very simple simulator device illustrated in FIG. 1. It will be recalled first of all that in an aircraft flying at Mach 2 to 2.5 there is provided for each passenger:

a cabin volume of 1 m.$^3$,
a flow of conditioning air $q$ of 0.010 kg./s.,
an air temperature $t_0$ at the air inlet of the cabin of 0° C.,
an air temperature $t_2$ at the air outlet of the cabin at 40° C.

In order to reproduce these normal conditions, the simulated cabin comprises an open-topped metal tank 1 of which the internal dimensions are 1m x 1m x 1m. This tank is housed in a completely thermally insulated casing 2 so that external conditions have no influence within the tank. Chocks (not shown) maintain the tank uniformly spaced from all the walls of the casing which has a central upper opening 3 to admit conditioning air and a lower central outlet 4 for evacuation of this air. The air circulates in the direction shown by the arrows, from the opening 3 towards the tank 1 through which it passes and from which it escapes from the open top of the tank and through the space provided between the tank and the casing after which it is evacuated through the opening 4.

A generator of cold and dry air is connected to the opening 3, a discharge meter enabling the quantity of air "$q$" admitted to the simulated cabin to be controlled. Moreover, an electrical resistance 5 is wound around the tank to simulate the addition of heat to the walls of the cabin of a supersonic aircraft. It is connected to an autotransformer, an ammeter and a voltmeter enabling the supply of electric current to be accurately controlled. Thermocouples are conveniently disposed to measure the temperature of the air $t_0$ at the inlet, $t_1$ in the tank and $t_2$ at the outlet. In this form, the simulating device enables normal conditions prevailing in the cabin of a supersonic aircraft flying at supersonic speed to be reproduced. Thus by regulating the quantity of air $q$ at a level of 0.010 kg./s. and the inlet temperature $t_0$ to 0° C. and by regulating the heat supply so that the temperature at the outlet $t_2$ is 40° C. (the electrical power being 400 w.), the mean temperature $t_1$ in the tank 1 can be maintained at 24° C.

The purpose of these experiments is to determine the influence of an atomised water spray in the tank 1 on the air conditioning. To this effect, an atomising generator 6 (of the centrifugal type driven by an electric motor) is disposed underneath the air inlet 3. In all the experiments, the heating is maintained at a constant level, since the experiment simulates a predetermined supersonic flight having practically invariable parameters.

In a first experiment, no change is made to the entry temperature of the air or to the quantiy of air employed, which remain respectively at 0° C. and 0.010 kg./s. An atomised spray is injected at a rate of 0.0001 kg./s. which engenders and maintains in the tank 1 a mean humidity of about 40%. It is observed that in the mean temperature in the tank 1 and in the exit temperature $t_2$ there is a drop of about 20° C. It may thus be concluded that in these conditions, the diffusion of atomised water enables the temperature to be lowered and a satisfactory humidity level to be created.

In a second experiment the flow of dry air entering the chamber is kept at $q=0.010$ kg./s. and the atomised spray discharge rate is held at $q=0.0001$ kg./s. so that the humidity remains at 40%, but by regulating the entry temperature $t_0$, it is desired to obtain a mean temperature in the tank 1 and an exit temperature substantially equal to the normal temperatures i.e. $t_1=24°$ C. and $t_2=40°$ C. It was found that the entry temperature $t_0$ must be 22° C. It can thus be concluded that in these conditions, the diffusion of the atomised spray enables air to be admitted at a higher temperature whilst maintaining a relatively satisfactory ambiant temperature and humidity.

In a third experiment, the inlet temperature $t_0=0°$ C., is maintained constant but the quantity of dry air $q$ entering the chamber and the quantity of atomised spray injected thereinto are adjusted so that the humidity remains substantially at 40%. It is desired to maintain the temperatures in the tank 1 and at the outlet in the region of the normal temperatures, namely $t_1=24°$ C. and $t_2=40°$ C. It was observed that the quantity of air $q$ must be regulated to 0.0064 kg./s. It can thus be concluded that in these conditions, the diffusion of the atomised spray enables the quantity of air circulating to be reduced whilst maintaining a relatively satisfactory ambiant temperature and humidity.

Other intermediate experiments were carried out, by modifying at the same time the entry temperature $t_0$ and the quantity of dry air $q$ so as to obtain a mean temperature $t_1=24°$ C. in the tank, an outlet temperature $t_2=40°$ C. and a humidity of 40%. The surve 7 of the graph of FIG. 2 illustrates the results obtained: the quantities $q$ in kg./s. are shown on the abscissae and the temperatures $t_0$ in ° C. on the ordinates.

It is clear from these experiments that the diffusion of an atomised liquid spray in the chamber provides a very simple and economical method of conditioning the air within the chamber which enables simultaneously heat to be evacuated from the chamber and a desired humidity to be maintained. In the particular case of conditioning the air within the cabin of a supersonic aircraft, the advantages are even more pronounced. These will be expressed in approximate figures hereunder.

In the case of an aircraft having 100 seats flying for 2 hours at Mach 2 to 2.5, the flow rate of conditioning air is 1 kg./s. This air enters the cabin at 0° C. and is evacuated in the baggage compartment at 40° C.

If the conditioning is carried out by diffusion of an atomised spray into the cabin on the basis of the second experiment (namely the same air flow $q$ but higher entry temperature $t_0$), the additional weight is as follows:

Weight of water consumed
$$=100 \times 2 \times 3,600 \times 0.0001 = 72 \text{ kg.}$$

Since this weight will be zero at the end of the flight, the

|  | Kg. |
|---|---|
| Average weight is $\frac{72}{2}+2$ | 38 |
| Weight of water reservoir | 7 |
| Weight of 5 atomisers: $5 \times 1.5$ | 7.5 |
| Total | 52.5 |

The gain with respect to a classic air conditioning system:

|  | Kg. |
|---|---|
| Diminution of 30% of final state exchangers | 40 |
| Elimination of the humidifier on the flight deck | 15 |
| Total | 55 |

Diminution of heat losses in the cold piping.

However, if the conditioning is carried out on the basis of the third experiment (namely same entry temperature $t_0$ and diminished water injection $q$) the weight required is as follows:

Weight of water consumed
$$=100 \times 0.00064 \times 2 \times 3,600 = 46 \text{ kg.}$$

Since this weight will be zero at the end of the flight the

|  | Kg. |
|---|---|
| Average weight will be $\frac{46}{2}+2$ | 25 |
| Weight of water reservoir | 5 |
| Weight of 4 atomisers | 6 |
| Total | 36 |

The gain in weight with respect to a classic conditioning system is:

Reduction of 36% of air flow rate in the conditioning system and therefore a gain in weight of at least 15% on 600 kg. _____ Kg. 90
Elimination of the humidifier on the flight deck __ 15

Total _____ 105

Diminution of 36% in the series of exchangers.
Diminution of 36% in the take off of air from the engines.

In practice, the optimum solution which should be chosen is situated on the curve 7 in the vicinity of the abscissa axis.

The water can be atomised and sprayed by any convenient atomising device but for preference a device is used employing rotating discs which are wet by a continually renewed layer of water in which atomisation of the layer takes place centrifugally.

FIG. 3 shows diagrammatically in cross section the fuselage of a supersonic airliner incorporating a system for carrying out the method of the present invention, and comprising an outer skin 1 within which is defined by an inner wall 2 a cabin 3 in which the seating positions of the passengers are represented. The interior of the fuselage includes a baggage compartment 4.

Dry breathable air is supplied to the interior of the cabin from a conventional air conditioning device (not shown), the air entering the cabin through the ducts shown at 5. Two entry points for atomised liquid are shown at 6. In the present embodiment it may be considered that the dry air enters the cabin at 0° C., and for this reason the liquid is injected into the air some distance from the entry point of the latter into the cabin where it is at a temperature greater than 0° C., thereby avoiding condensation and freezing phenomena. A possible circulation path of air and liquid in the fuselage is shown, and it will be seen that the heated atmosphere is removed from the cabin at the opening 7 and transferred, as shown by the arrows, via the ducting 8 between the fuselage 1 and cabin wall 2 into the baggage hold 4 whence it is evacuated through the opening 9.

The fuselage walls may be in the region of 150° C. during supersonic flight of the aircraft, and the method of the invention enables the interior cabin temperature to be maintained at approximately 24° C. whilst at the same time enabling a satisfactory humidity level to be maintained without the addition of heavy auxiliary apparatus.

The dry air entering the cabin may be at a temperature higher than 0° C., for example 15° C., before entering the cabin, and in this case the liquid injection points 6 may be in the immediate vicinity of the air inlets 5 since there is no question of condensation or freezing occurring upon mixing the liquid and air.

It will be appreciated that liquid injection points may be distributed throughout the cabin and flight deck of the supersonic aircraft in sufficient quantities and in such locations as to maintain a substantially constant predetermined cabin temperature and humidity. The liquid most commonly used is water, although various substances such as perfumes or disinfectants for example may be mixed with the basic liquid.

The delivery of water to the entry points 6 can be readily controlled in accordance with the cabin temperature by providing one or more thermocouples 11 in the cabin and by connecting the thermocouple to a suitable control device 12 which is connected by line 13 to control the operation of a valve 14 regulating the rate of delivery of liquid to conduits 15 feeding entry points 6.

What is claimed is:

1. A method of cooling the interior of an airborne vehicle whose external walls are at a temperature above that to be maintained in the interior, comprising the steps of: continuously introducing into the interior of the vehicle air at a temperature below that to be maintained in the interior; injecting a finely atomized evaporatable liquid into the interior at a point where the temperature is sufficiently high to completely evaporate the liquid; and continuously evacuating air carrying the resulting vapor before the vapor can revert to its liquid phase.

2. A method according to claim 1 wherein the quantity of liquid injected is controlled automatically in dependance upon the temperature of the vehicle interior.

3. The method of claim 2 wherein vehicle is a supersonic aircraft, the liquid is water and is injected at such points and in sufficient quantities to ensure maintenance of a substantially constant pre-determined temperature and humidity.

4. The method of claim 3 wherein the air is introduced into the interior at a temperature of about 0° C. and the liquid is injected at a point remote from the atmosphere entry point.

5. The method of claim 3 wherein the air is introduced into the interior at a temperature above 0° C. and the liquid is injected at a point close to the atmosphere entry point.

References Cited

UNITED STATES PATENTS

| | | | |
|---|---|---|---|
| 1,749,763 | 3/1930 | Fleisher | 98—30 |
| 2,199,485 | 5/1940 | De Vout | 62—121 X |
| 3,110,613 | 1/1964 | Evelyn et al. | 244—117 X |
| 3,363,531 | 1/1968 | Kohlmeyer et al. | 98—30 |

WILLIAM E. WAYNER, Primary Examiner

U.S. Cl. X.R.

98—30; 165—3; 236—44; 244—117

PO-1050
(5/69)

UNITED STATES PATENT OFFICE
CERTIFICATE OF CORRECTION

Patent No. 3,483,711      Dated December 16th, 1969

Inventor(s) Jérémie Malczewski

It is certified that error appears in the above-identified patent and that said Letters Patent are hereby corrected as shown below:

Column 1, line 5, change "Bronzavin" to --Bronzavia--.
Column 4, line 66, change "0.00064" to --0.000064--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents